United States Patent

[11] 3,589,802

[72] Inventor Edmund Amaru
 7618 S. Placid St., Las Vegas, Nev. 89109
[21] Appl. No. 759,747
[22] Filed Sept. 13, 1968
[45] Patented June 29, 1971

[54] OPHTHALMIC MOUNTING
 2 Claims, 6 Drawing Figs.
[52] U.S. Cl. .................................................. 351/90,
 351/154
[51] Int. Cl. .................................................. G02c 1/08
[50] Field of Search............................................ 351/90,
 99—101

[56] References Cited
 FOREIGN PATENTS
 673,815 10/1929 France .......................... 351/90
 1,429,383 1/1966 France .......................... 351/90

Primary Examiner—David Schonberg
Assistant Examiner—Robert L. Sherman
Attorney—Strauch, Noaln, Neale, Nies & Kurz ABSTRACT: This invention relates to split-rim ophthalmic mountings or split-rim eyeglass frames with particular means for quickly changing lenses, without the use of additional tools. The inventive ophthalmic mountings with a pleasing appearance is particularly functional in allowing the lenses to be readily removed and changed for another or, in the alternative, allows the use of the lenses in another set of mountings.

PATENTED JUN 29 1971  3,589,802
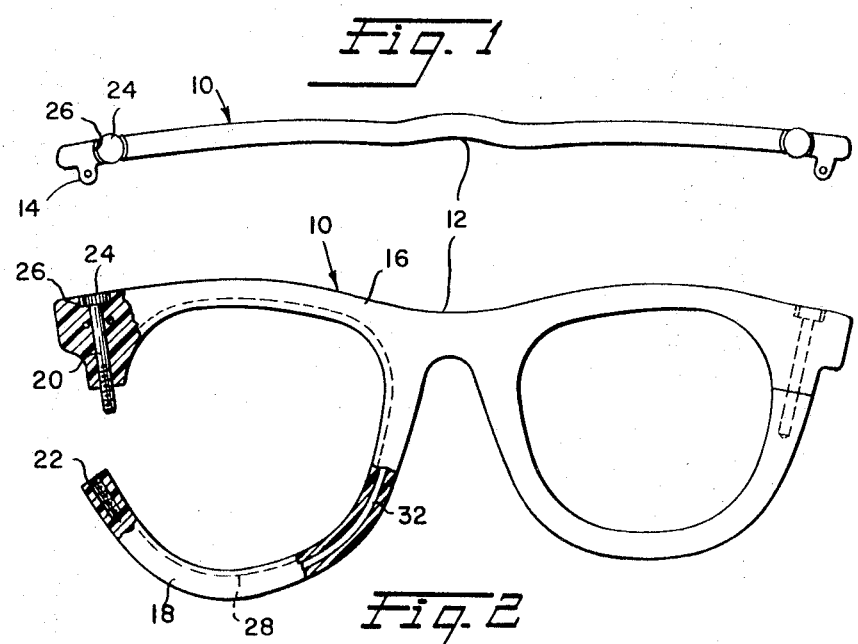
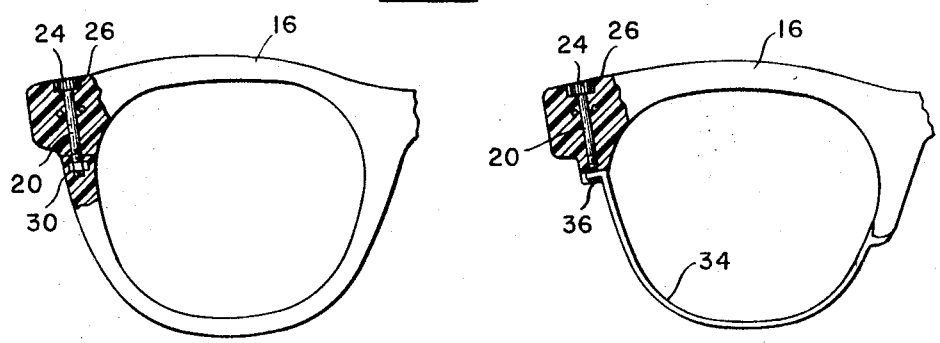
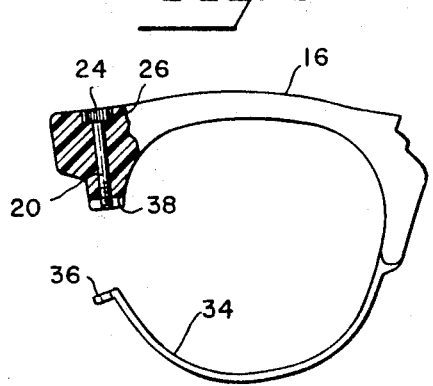
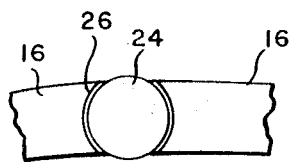
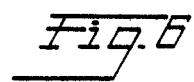
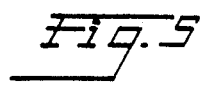
INVENTOR.
EDMUND AMARU
BY
Bartholomew A. Higgins
ATTORNEY

OPHTHALMIC MOUNTING

The appearance of spectacles or eyeglasses is almost as important as their corrective effect and it has become fairly common for the wearers of spectacles or eyeglasses to use or want different frames for different occasions. Some spectacle frames are particularly designed for formal or evening wear while others are designed for business and still others for sport.

Also it has become quite common to use different types of spectacle lens for different occasions. Normally clear lenses are used for reading, business and other indoor occupations while tinted lenses are common for outdoor use. It may also be desirable in the case of bifocal users to have bifocals for normal use but to prefer single-vision lenses for driving, golf or similar activities.

Spectacle lenses and frames have become so expensive that it is impractical to have complete spectacles for each individual need and activity but heretofore there has been no practical way in which the spectacle wearer can change lenses from pair of frames to another or to change lenses in a single frame without the use of special tools or without destroying completely the cosmetic effect of the spectacles.

Most present-day spectacles from which the lenses can be removed at all require the use of a jeweler's screwdriver and the tiny screws are so small that they are difficult to handle and their threads would be destroyed after a few operations.

Goggles have been provided in which the lenses may be readily removed or replaced by hand such as U.S. Pat. No. 2,114,644. But the appearance of these goggles is such that they would not be used for normal wear.

The present invention overcomes these difficulties by providing split-rim eyeglass frames in which the lenses are secured in place by a screw which may be operated by the fingers. The screw is so designed that, rather than destroying the cosmetic effect of the frame, it may actually give the appearance of a decorative addition.

It is one of applicant's primary objectives to provide a pair of eyeglass frames of the split-rim type that have a suitable appearance for social wear and yet allow the ready, rapid separation of the upper split-rim frame section from the lower split-rim frame section so as to facilitate removal and change of one lens for another without the use of any tools.

It is a particular object of this invention to provide a split-rim spectacle frame wherein the split-rims are releasably secured by a threaded screw or bolt with an enlarged head or crown that is countersunk into one section of the split-rim frame. In one embodiment the head or crown of the screw has an exterior peripheral surface that is burrlike or roughened to facilitate turning the screw with the thumb and forefinger.

FIG. 1 is a plan view of the spectacle frame showing one embodiment of the present invention.

FIG. 2 is a front view of the frame shown in FIG. 1 with parts in section.

FIG. 3 is a fragmentary front view with parts in section of another embodiment of this invention.

FIG. 4 is a fragmentary front view with parts in section of a further modification of the invention.

FIG. 5 is a fragmentary front view of the modification shown in FIG. 4 with the frame in open position.

FIG. 6 in an enlarged fragmentary plan view illustrating the relation of the screwhead to the frame.

The spectacles of the present invention are of generally conventional form having the usual lens holding portions 10 connected by a bridge 12. Suitable hinges 14 are provided at the outer ends of the frame for pivotally holding suitable temples not shown.

As shown particularly in FIGS. 1 and 2, the lens-holding portions are of the split-rim type having an upper portion 16 and a lower portion 18 which may be moved away from the upper portion as shown in FIG. 2 to permit removal or insertion of a lens.

The upper portion 16 and lower portion 18 of the split rim are releasably secured together by a screw or a bolt 20 which is rotatable in the upper portion 16 and engages in threads 22 in the lower portion 18. This screw 20 is provided with an enlarged head 24 which is seated and partially concealed within a recess or countersink 26 in the upper portion 16 of the split rim. The parts are so designed and constructed that the tope of the head 24 does not project substantially beyond the top line of the frame and the edges of the head 24, while accessible to the fingers, do not project substantially beyond the front and rear surfaces of the frame member. As particularly shown in FIG. 6, the head 24 is partially enclosed to prevent accidental loosening of the screw 20.

As shown in FIGS. 1, 2 and 6, the crown or head 20, which is oversized, is located within the confines of the top of the frame or upper rim member 16 as well as being countersunk so as to be flush with top of the frame. The head 24 may be of the same color and material as frame portion 16 so as to be substantially invisible or it may be of different color or material or both so that the visible portion of the edge has a decorative effect.

A similar mounting of the crown or head 24 could be accomplished by countersinking the head in the lower rim or frame member with a suitably threaded engaging nut or threaded portion being located in or attached to or integral with the upper rim or frame member.

The frame member 16 may be made of a suitable material such as metal or plastic. Suitable plastics and metals are well known in the ophthalmic industry and the plastics may be reinforced with metal. The particular materials form no part of the present invention and any suitable materials may be used. It should be understood that the material used is such that the recess 26 in the top face of the frame may be cut, molded or otherwise formed in the upper face to provide a recessed seat for a crown or head of sufficient size that the crown to be readily turned by the thumb and finger of the hand while the crown or head is within the confines of the frame member.

As shown in FIG. 2, the frame portions 16 and 18 are split and may be spread apart to permit the removal or replacement of a lens within a suitable groove 28 around the internal periphery of the rim portions.

The modification shown in FIG. 3 is essentially the same as that shown in FIGS. 1, 2, and 6 with the exception that a nut 30 is mounted or embedded in the lower split-rim frame portion 18. The nut 30 may be secured in position by molding or other conventional technique and the bolt or screw 20 engages in the threads in nut 30 thereby securing rim portions 16 and 18 together to hold a lens within the confines of the upper and lower split frame members.

It will be readily apparent to one skilled in the art that the material from which the frame portions 16 and 18 are made must be sufficiently resilient and flexible to allow relative motion between the two frame members and permit the removal of a lens. Since only limited relative motion is required, it is not necessary that both upper and lower sections of the frame be flexible so long as one frame section is sufficiently flexible that it is possible to open the frame to remove a lens and replace it with another. If desired, the lower portion 16 may be reinforced with a metal insert 32.

The head 24 of the screw 20 is preferably knurled for convenient operation and is preferably almost entirely closed within the upper frame portion 16. As shown in FIG. 6, the diameter of the head 24 is substantially the same as the thickness of the upper frame portion 16 so that the head 24 does not substantially protrude in such a way that it may be accidentally turned. When the head 24 is of the same material and color as the frame portion 16, it is substantially invisible from a short distance of the wearer. At the present time it is fairly common to provide eyeglasses with inserts or other ornamentation for decorative purposes and in such glasses, the head 24 may be colored or decorated so as to blend with other ornamentation.

FIGS. 4 and 5 show a modified form of the invention in which the upper frame portion 16 is formed of plastic or the like as in FIGS. 1 and 2 while the lower portion 34 is a separate piece, usually metal, suitably fixedly secured at the bridge end of the upper portion 16. Ophthalmic frames of this type are well known.

The outer, or temple end of the lower rim portion has a shoulder 36 which fits into a seat or recess 38 in the temple side of the upper frame portion 16. This projection or shoulder 30 is threaded to releasably engage a screw 20, which is in all respects substantially the same as the screw 20 in the other modification. When the screw 20 is released from the shoulder 36, the frame portion 34 is free to move and open as shown in FIG. 5 and thus permit the ready removal or insertion of a lens.

From the foregoing it will be apparent that I am able to obtain the objects of my invention and provide eyeglasses or spectacles of the split-rim type in which the lenses are releasably secured in the frame in such a manner that they may be removed or replaced by hand without the need of special tools. Various modifications of this invention may of course be made without departing from the spirit of the invention or the scope of the appended claims.

I claim:

1. Ophthalmic mountings comprising a spectacle frame having a pair of lens openings each defined by a rim having a groove for receiving and holding an ophthalmic lens, each frame rim having upper and lower portions which are separable in the temple region to permit spreading of said portions for insertion of an ophthalmic lens into the opening, means for securing the separable ends of said portions together comprising a first opening in said upper portion, said opening having an enlarged recess at its upper end, an aligned threaded opening in said lower portion, a threaded member projecting through said first opening for engagement with the threads in said threaded opening, said threaded member having a head received within said recess, said head having a diameter substantially equal to the thickness of said upper portion but extending slightly beyond the sides of said upper portion, said recess being slightly larger than said head so that portions of said head are accessible for engagement by the fingers so that said head may be turned without the use of any tools, and the top of said head being substantially contiguous with the top surface of said upper portion.

2. The spectacle frame of claim 1 wherein said lower portion is provided with a threaded nut for engagement with the threaded member.